US012768819B2

(12) United States Patent
de Lima

(10) Patent No.: US 12,768,819 B2
(45) Date of Patent: Oct. 20, 2026

(54) THICKNESS MEASUREMENT DEVICE IN SUBMARINE PIPELINES SIMULTANEOUSLY AT MULTIPLE POINTS

(71) Applicant: PETRÓLEO BRASILEIRO S.A.—PETROBRAS, Rio de Janeiro (BR)

(72) Inventor: Henri Fiorenza de Lima, Vitória (ES)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 341 days.

(21) Appl. No.: 18/397,496

(22) Filed: Dec. 27, 2023

(65) Prior Publication Data

US 2025/0216363 A1 Jul. 3, 2025

(30) Foreign Application Priority Data

Dec. 27, 2023 (BR) .......................... 1020220266905

(51) Int. Cl.
*G01N 29/22* (2006.01)
*G01N 29/04* (2006.01)

(52) U.S. Cl.
CPC ........... *G01N 29/223* (2013.01); *G01N 29/04* (2013.01); *G01N 2291/02854* (2013.01); *G01N 2291/105* (2013.01)

(58) Field of Classification Search
CPC ........... G01B 17/02; G01N 2203/0274; G01N 2223/628; G01N 2291/02854;
(Continued)

(56) References Cited

U.S. PATENT DOCUMENTS

| | | | | |
|---|---|---|---|---|
| 4,760,738 A * | 8/1988 | Katamine | G10K 11/02 | |
| | | | 73/644 | |
| 5,280,724 A * | 1/1994 | Higo | G01N 29/24 | |
| | | | 73/624 | |

(Continued)

FOREIGN PATENT DOCUMENTS

| | | | |
|---|---|---|---|
| CN | 113661391 A * | 11/2021 | G01N 29/245 |
| DE | 4239229 A1 * | 6/1994 | G01B 17/02 |

(Continued)

OTHER PUBLICATIONS

Instanes et al, Unique Technology for 3D Integrity Monitoring of Subsea Pipes, Paper presented at the Abu Dhabi International Petroleum Exhibition and Conference, Abu Dhabi, UAE, Nov. 2015. Paper No. SPE-177404-MS, OnePetro (Year: 2015).*

*Primary Examiner* — David L Singer
(74) *Attorney, Agent, or Firm* — McCarter & English LLP; Wei Song

(57) ABSTRACT

An ultrasonic sensor matrix is described. The matrix adjusts to the outer circumference of a submarine equipment pipeline or tubular body to be inspected. The matrix is preferably constructed with the aid of a pipeline circumference template to be inspected, so that the sensors are positioned correctly around the pipeline circumference. The sensor matrix is taken to the submarine pipeline by a diver or ROV and fixed to said pipeline. Thus, the inspection is carried out at several points simultaneously, generating a high-resolution inspection capable of scanning a much larger area of the pipeline circumference than conventional devices.

4 Claims, 8 Drawing Sheets

(58) Field of Classification Search
CPC ....... G01N 2291/105; G01N 2291/106; G01N 2291/2634; G01N 29/04; G01N 29/223
See application file for complete search history.

(56) References Cited

U.S. PATENT DOCUMENTS

| | | | | |
|---|---|---|---|---|
| 2013/0298937 | A1* | 11/2013 | O'Donnell | B08B 9/027 134/1 |
| 2016/0231281 | A1* | 8/2016 | Dingman | B63C 11/52 |
| 2022/0341892 | A1* | 10/2022 | David | G01N 29/07 |
| 2024/0219351 | A1* | 7/2024 | Lieske | G01F 23/296 |

FOREIGN PATENT DOCUMENTS

| | | | | | |
|---|---|---|---|---|---|
| KR | 101994443 | B1 | * | 9/2019 | G01B 7/063 |
| WO | 2016/049645 | A1 | | 3/2016 | |

* cited by examiner

THICKNESS MEASUREMENT DEVICE IN SUBMARINE PIPELINES SIMULTANEOUSLY AT MULTIPLE POINTS

FIELD OF THE INVENTION

The present invention relates to the field of submarine measurement equipment. More specifically, the present invention relates to a device capable of simultaneously measuring thickness at multiple points in pipelines or tubular bodies of submarine equipment.

BACKGROUND OF THE INVENTION

Submarine equipments and pipelines, used by the petroleum industry, for the production, circulation or injection of fluids, are typically made of metallic alloys that are subject to environmental weather and the aggressiveness of internally conducted fluids. They commonly present loss of thickness due to corrosion and/or erosion, mainly on the internal side, since, externally, they have a paint coating, in addition to cathodic protection. Internally, either due to the fluids composition, which aggressiveness can vary greatly from well to well, or due to the reached speeds, different mechanisms can occur, such as erosion concentrated in points of greatest susceptibility, uniform corrosion or corrosion concentrated in some points (pitting). This reduction in wall thickness impacts the reduction of the capacity of resisting to operational and environmental loads due to the pressure exerted by the hydrostatic column, on the seabed, where such equipment is located. As this loss may not be uniform, there is always doubt as to whether the worst point was detected in the measurements using conventional resources.

To monitor the thickness of submarine pipelines and equipment, ultrasound or magnetic field technologies are typically used. Internally, there are devices known as instrumented pigs, however, externally, individual sensors are used, with the aid of ROV (Remotely Operated Vehicle). The pigs have sensors positioned circumferentially and scan as they move inside the pipelines. These have limitations in passing through submarine equipment due to the variations in diameter and curvature radius observed, which often make this operation unfeasible. Coupon and probe monitoring can be alternatives to submarine equipment (typically, manifolds and Wet Christmas Trees-WCTs), however, these must be resident and increase the equipment complexity, being very little used, and even when they are used many times, they may not be located in the most representative defect points, serving only as inference and maintaining the need for inspections in certain cases. Portable sensors, when operated by ROV or even divers in shallow waters, require quite expensive resources (appropriate vessel that typically costs between US$ 70 thousand and 100 thousand per day), which limits the operation time, compromising a Possible attempt to increase resolution by inspecting multiple points. Normally, some sections located at points with the greatest potential for loss of thickness are taken (just downstream of curves), with 4 points offset by 90° in each section. Therefore, it has low resolution, as there are four points inspected in each section and the sensor's operating area is smaller the smaller the remaining thickness. Current devices have a single head, and handling the tool by ROV is complex, which also compromises service productivity.

State of the Art

International publication WO2016049645 A1, published on Mar. 31, 2016, discloses systems, apparatuses, and methods that include a pipeline inspection apparatus containing a carriage, a first member including at least a first and second sensor configured to take a first round of measurements of a pipe, a second member including at least a third and fourth sensor configured to take a first round of measurements of the pipe, and a multiplexer. The first and second members are attached to opposite side members of the carriage. The carriage, first member, and second member are configured to surround a section of the pipe and are movably mountable on the pipe. The multiplexer receives a signal from the at least first, second, third, and fourth sensors and creates a measurement signal.

More specifically, it discloses apparatus, systems and methods for the rapid and efficient inspection of submerged pipes using an ROV and an inspection apparatus containing multiple PEC (pulsed eddy current) sensors. The PEC sensors may be configured to take measurements of a section of the pipeline on which the inspection apparatus is placed and send multiple signals which are eventually converted into a single measurement signal for conveyance to software which may be on the ROV. The software calculates an average wall thickness of the section of the pipeline from this measurement signal. In an exemplary embodiment, a second measurement of this section of pipe may be taken using an ultrasonic sensor if the average wall thickness of the section of pipe is below a desired amount.

In an exemplary embodiment, it provides for an inspection apparatus, system, and method that may be employed for ROV deepwater inspection of non-piggable pipelines. This document is based on the PEC principle and presents a reliable method to survey ferrous pipes and vessels through their thermal insulation, marine build-up, and protective coatings. The PEC sensors may be utilized to identify areas on the pipelines in need of further inspection. If such a need is detected, additional inspection methods such as ultrasonic inspection may then be used.

Therefore, the technique lacks devices capable of generating a thickness measurement at several points simultaneously in order to generate a high-resolution image that has great reliability in detecting failures wherever they may be located.

SUMMARY OF THE INVENTION

The present invention provides the use of an ultrasonic sensor matrix, wherein the matrix adjusts to the outer circumference of a submarine equipment pipeline or tubular body to be inspected. For the sake of brevity, the pipeline or tubular body of a submarine equipment will be referred hereinafter to simply as pipeline, without, however, limiting the scope intended herein. The matrix is preferably constructed with the aid of a pipeline circumference template to be inspected, so that the sensors are positioned correctly around the pipeline circumference. The sensor matrix is taken to the submarine pipeline by a diver or ROV and fixed to said pipeline. Thus, the inspection is carried out at several points simultaneously, generating a high-resolution inspection capable of scanning a much larger area of the pipeline circumference than conventional devices.

BRIEF DESCRIPTION OF THE DRAWINGS

The present invention will now be described below with reference to the typical embodiments thereof and also with reference to the attached drawings, in which.

DETAILED DESCRIPTION OF THE INVENTION

Specific embodiments of this disclosure are described below. In an effort to provide a concise description of these embodiments, all features of an actual implementation may not be described in the specification. It should be appreciated that in the development of any actual implementation, as in any engineering project or design, numerous implementation-specific decisions must be made to achieve developers' specific goals, such as compliance with system- and business-related constraints, which can vary from one implementation to another. Furthermore, it should be appreciated that such a development effort may be complex and time-consuming, but would nevertheless be a routine design and manufacturing undertaking for those of ordinary skill having the benefit of this disclosure.

Figure 1:
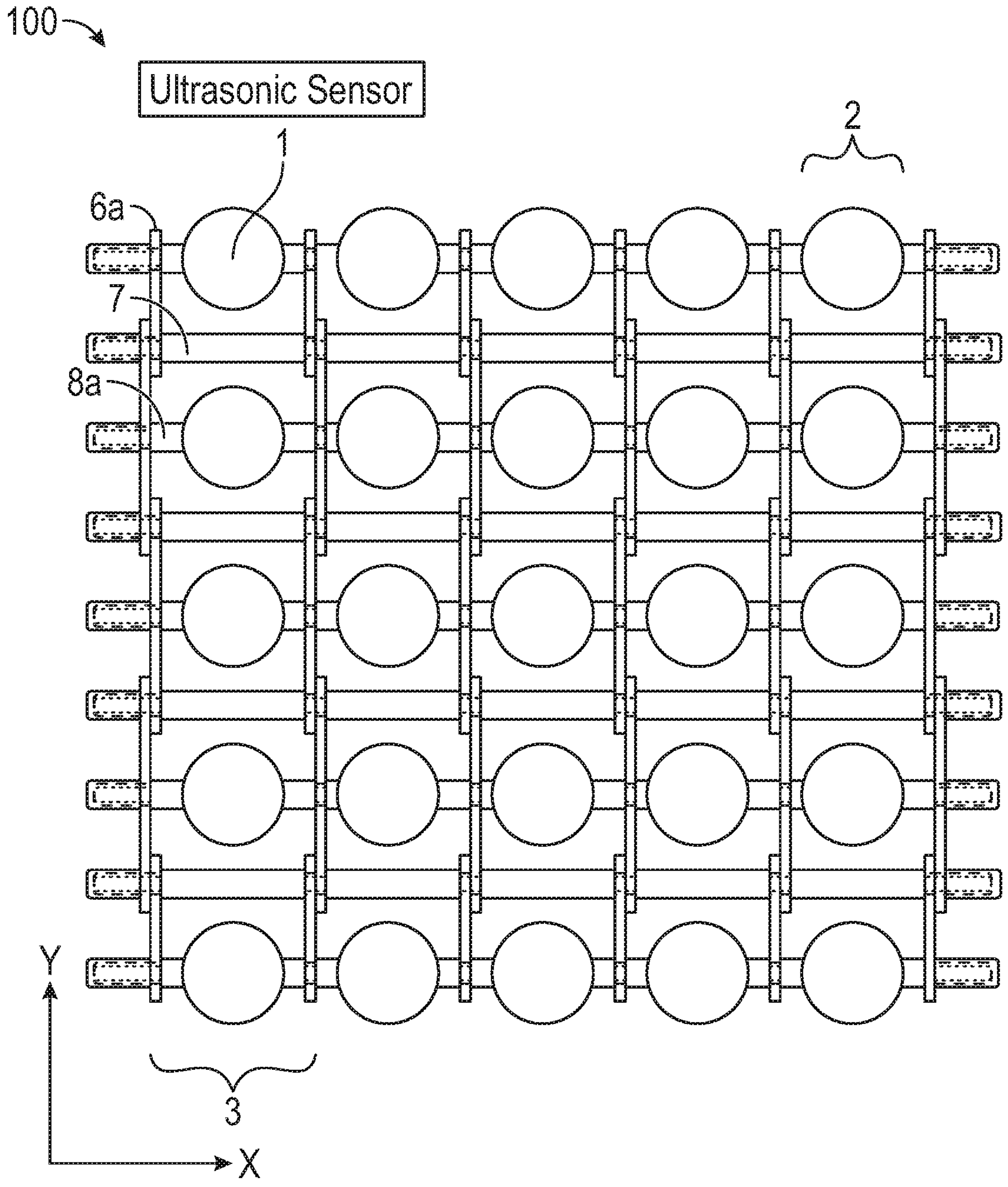
FIG. 1 is a representation of the measuring device according to a first embodiment of the present invention.

A preferred embodiment of the device 100 of the present invention is shown in FIG. 1 in an open form. The device 100 according to the present invention has a plurality of troughs 3 mounted side by side, each trough 3 having a plurality of housings 2 where the ultrasonic sensors 1 will be installed. In the example of FIG. 1, device 100 has five troughs 3, each having five housings 2, defining a matrix of twenty-five sensors 1. Obviously, this embodiment is only exemplary and not limiting. Device 100 may have any number of troughs and housings without departing from the scope of the present invention.

Figure 2:
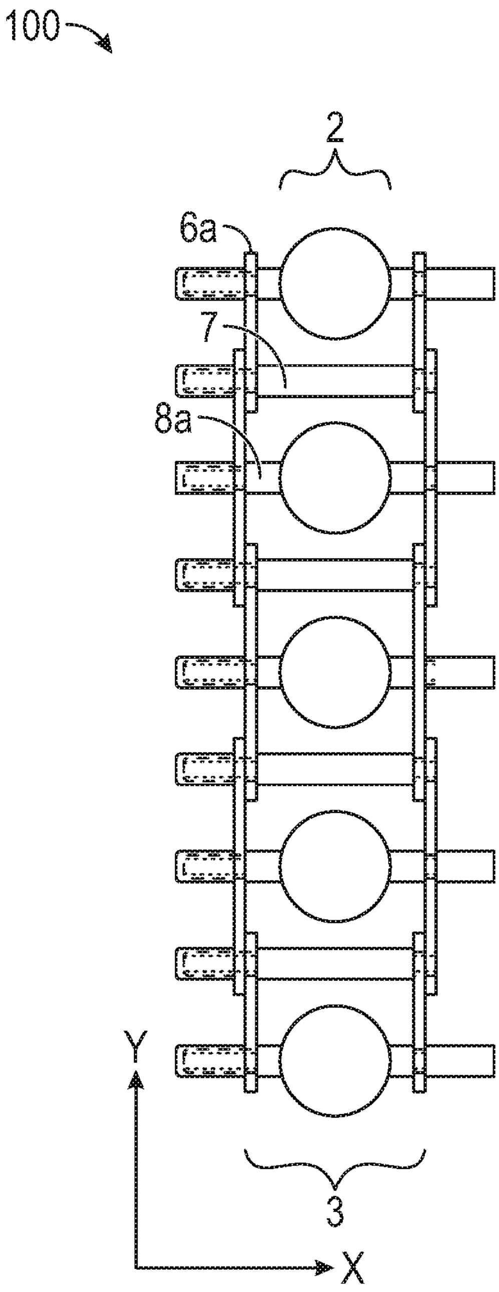
FIG. 2 is a detail of the present invention device according to the embodiment of FIG. 1.
Figure 3:
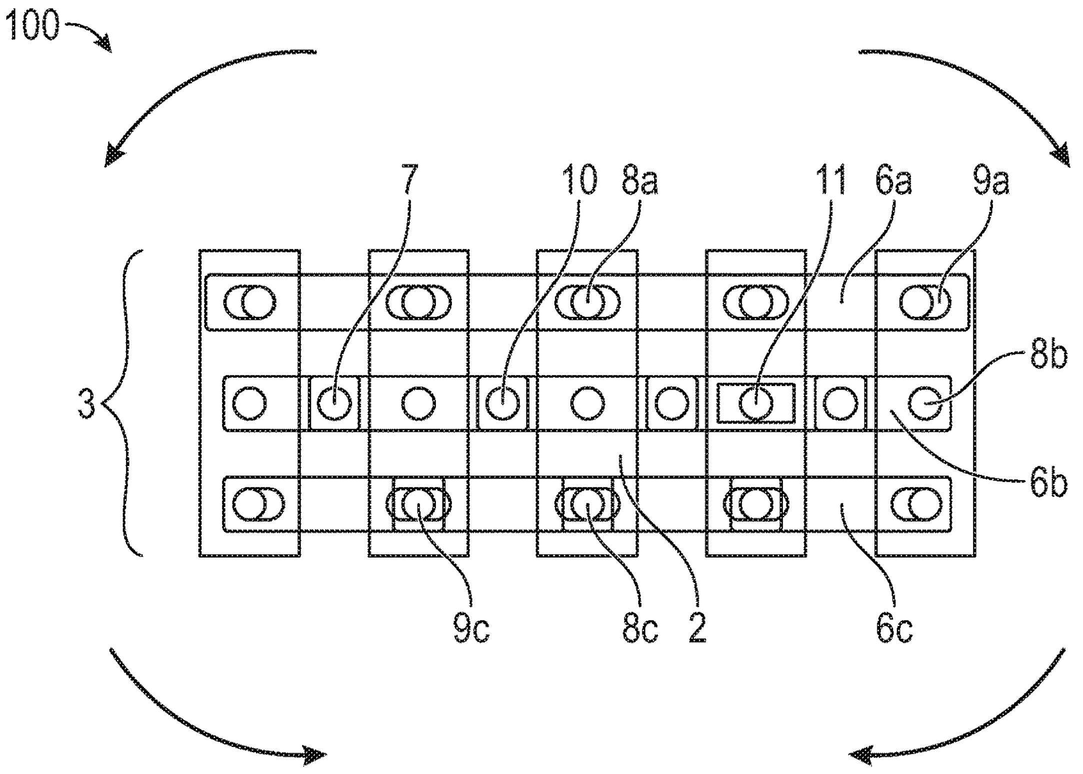
FIG. 3 is a side view of the present invention device according to the embodiment of FIG. 1.

Each trough 3 has multiple sets of upper 6*a*, central 6*b* and lower 6*c* latitudinal rods, the latter visible in FIG. 3. As seen in FIG. 1, the upper latitudinal rods 6*a* are connected to each other by their ends in an interspersed manner, these ends having ports 9*a* that are crossed by a support rod 8*a* (seen more closely in FIG. 2). The connection between the ports 9*a* and the support rod 8*a* allows freedom of relative movement between the upper latitudinal rods 6*a*, so that they can move away from or towards each other in the y-axis direction/or rotate around the x-axis. These movements are limited only by the size of the port 9*a* and the circumference of the support rod 8*a*. This connection has locking elements (not shown) to lock the relative position of the upper latitudinal rods 6*a* and prevent further movement. For example, a pair of nuts may be introduced surrounding port 9*a*, where the nuts are tightened to lock and prevent further movement.

The support rods 8*a* have the additional function of supporting the housings 2. Each support rod 8*a* comprises several separate and individual sections, where the intermediate sections support two housings 2, passing through a port 9*a*, and the end sections support only one housing 2 and pass through a port 9*a*. Support rods 8*b* and 8*c*, which will be discussed below, have similar functions and constructions.

FIG. 3 is a side view of the device 100 looking from the origin to the x direction in the reference adopted herein, in an open form, that is, before being conformed to the curvature of a tube to be inspected. One can see, in addition to the upper latitudinal rods 6*a*, two other sets of latitudinal rods: the central latitudinal rods 6*b* and lower latitudinal rods 6*c*.

The lower latitudinal rods 6*c* are positioned and connected in an analogous way to the upper latitudinal rods 6*a*, defining ports 9*c* being crossed by support rods 8*c* analogous to the support rods 8*a*, with an important difference: the lower latitudinal rods 6*c* have a length shorter than the length of the upper latitudinal rods 6*a* and the ports 9*c* define a displaced space, in relation to the ports 9*a*. This implies in freedom of expansion movement in relation to the freedom of movement of the upper latitudinal rods 6*a* and in contraction, when considering rods 6*c*. From this open form of the device 100, movement of the trough elements 3 causes the housings 2 to move in the direction of the red arrows.

The connection between the support rods 8*c* and the lower latitudinal rods 6*c* also has locking elements (not shown) to lock the relative position of the lower latitudinal rods 6*c* and prevent further movement. For example, a pair of nuts may be introduced surrounding port 9*c*, where the nuts are tightened to lock and prevent further movement.

The central latitudinal rods 6*b* are also interspersed with each other and are even shorter in length than the lower latitudinal rods 6*c*, so that one central latitudinal rod 6*b* meets the next central latitudinal rod 6*b* in the interval space between the housings 2 in the Y direction, being connected to each other through a hole 10 crossed by a longitudinal rod 7. This connection only allows relative rotational movement around the X axis, not allowing movement in other directions. Unlike the other latitudinal rods, each central latitudinal rod 6*b* has one end connected to the end of the next central latitudinal rod 6*b*, being crossed by the longitudinal rod 7 as explained previously, and the other end of each central longitudinal rod 6*b* is crossed by a support rod 8*b* (analogous to support rods 8*a* and 8*c*) in a orifice 11. Unlike the other connections, the orifice connection 11 does not allow any relative movement between the support rod 8*b* and the central latitudinal rod 6*b*.

Throughout the above description and preferably, the longitudinal rods 7 and the support rods 8*a*, 8*b* and 8*c* are rigid.

In an alternative embodiment, the longitudinal rods 7 as well as the support rods 8*a*, 8*b* and 8*c* may comprise flexible elements instead of rigid ones, in order to adapt to curved tubular sections. For example, the longitudinal rods 7 and the support rods 8*a*, 8*b* and 8*c* can be springs, without being limited to just that.

Therefore, each trough 3 defines, for each housing 2, a pair of ports 9*a*, a pair of ports 9*c*, a pair of orifices 10, a pair of orifices 11, three rigid or resilient support rods 8*a*, 8*c*, 8*c*, a rigid or resilient longitudinal rod 7, a pair of upper latitudinal rods 6*a*, a pair of central latitudinal rods 6*b*, and a pair of lower latitudinal rods 6*c*.

Figure 4:
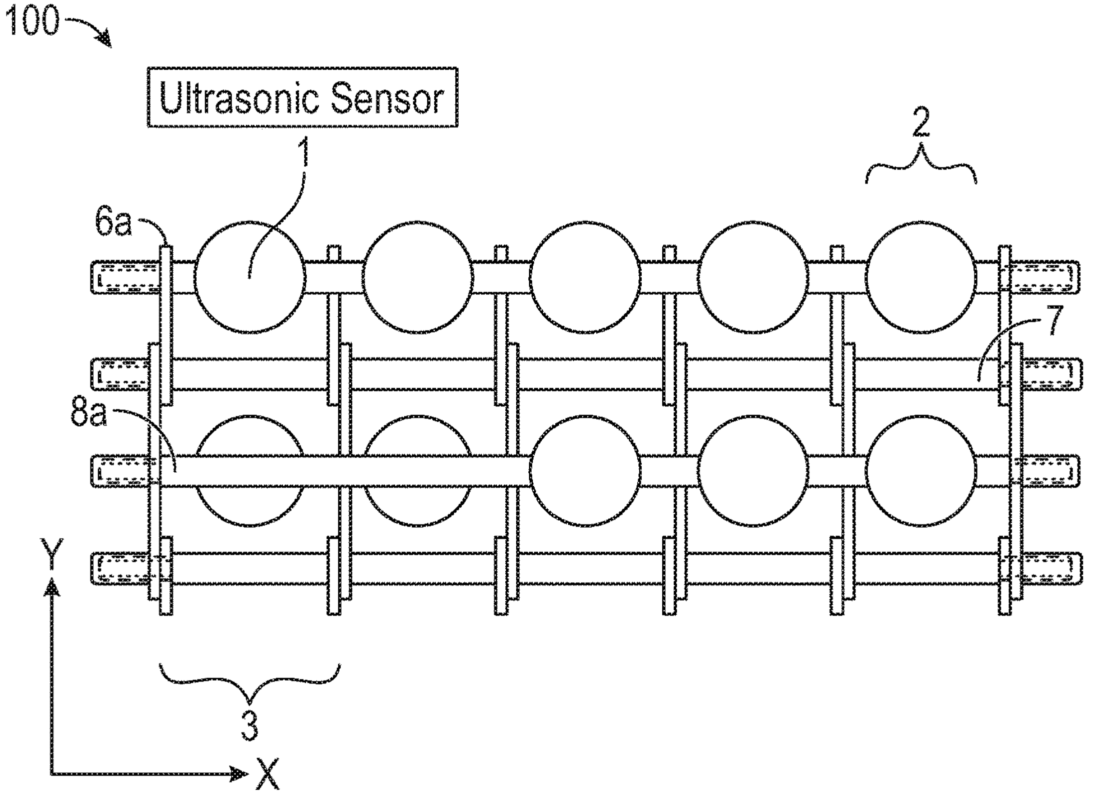
FIG. 4 is a detail of a measuring device representation according to a second embodiment of the present invention.

FIG. 4 is a top view of a device 100 detail in accordance with an alternative embodiment of the present invention. In this embodiment, rods 7 and 8*a*, 8*b* and 8*c* are flexible rather than rigid to facilitate adaptation to curved sections of the pipeline. In this embodiment, the rods 7 and 8*a*, 8*b* and 8*c* can be, for example, springs, without being limited to this.

Figure 5:
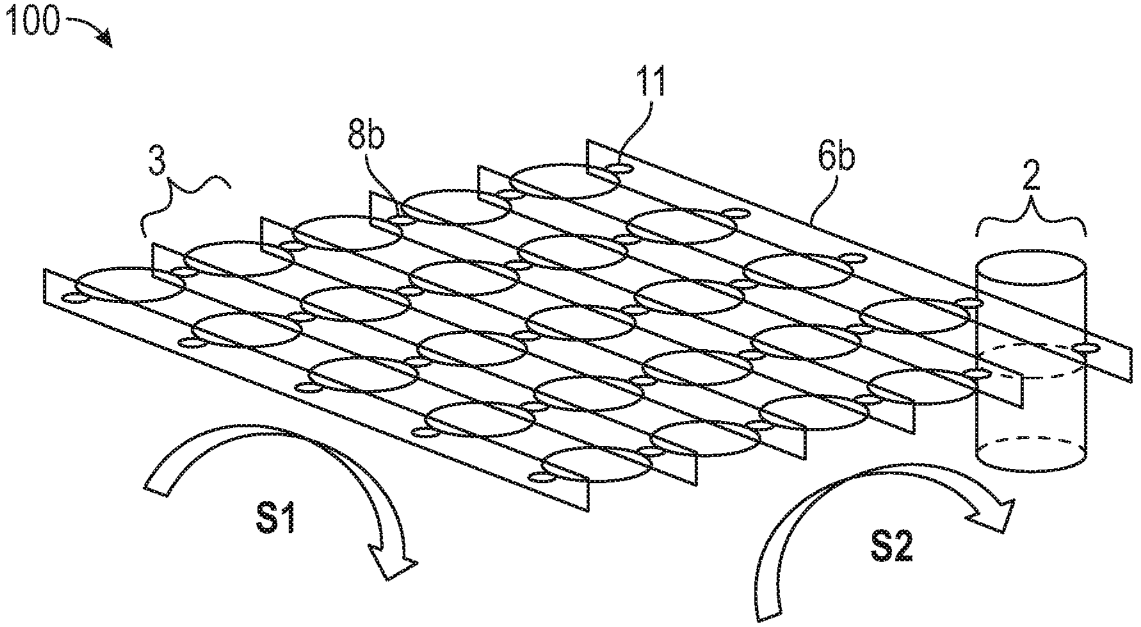
FIG. 5 is a simplified isometric view of the present invention device according to the embodiment of FIG. 4.

FIG. 5 is an isometric view of the embodiment of FIG. 4. Several details have been simplified or omitted in FIG. 5 for ease of visualization. The flexible construction of the rods 7 and 8*a*, 8*b* and 8*c* allows the device 100 to be flexed smoothly in the direction of arrow S2, while, in the direction of arrow S1, the shaping occurs by the relative displacement of rods 6*a* and 6*c*. This enables the device 100 to adapt to any type of pipeline curvature commonly found in the field. The device 100, in this embodiment, can also be molded around a template as in the embodiment in which the rods are rigid, with the exception that the template in this case is a curve. As previously disclosed, locking elements (not shown) can lock the rods in the desired position.

Figure 6:
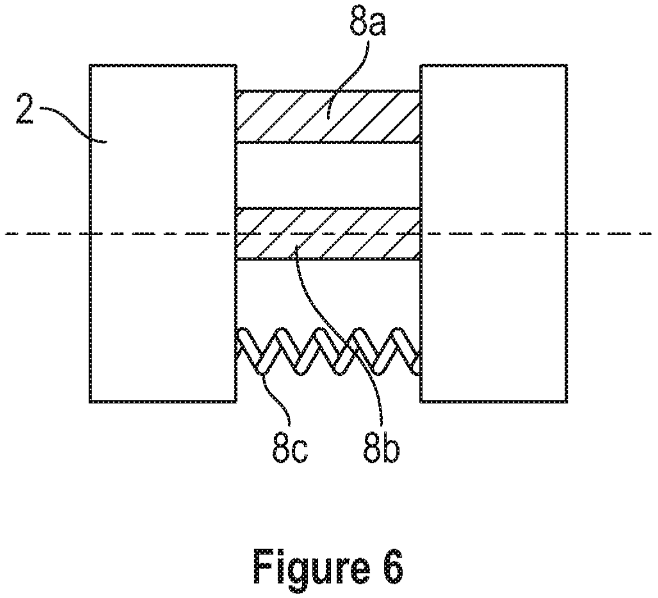
FIG. 6 is a side view of the present invention device according to the embodiment of FIG. 4.

Finally, FIG. 6 shows a side view of the embodiment of FIG. 4 of the device 100, looking from the origin to the Y direction in the reference adopted herein, where one can see the flexible support rods 8*a*, 8*b*, 8*c*, in the embodiment by springs. In this embodiment, the support rods 8*a*, 8*b*, 8*c* are deformed through compression, via the gauntlet for the ROV handle located above the device 100. The gauntlet is located above a geometric center of the device 100 and is coupled thereto at strategic locations, for example, at each of the vertices of the device 100 and/or to the midpoints of one or more of the device 100 edges, to apply pressure and deform the flexible rods 7 and 8*a*, 8*b* and 8*c*. There must be joints in the connection between the gauntlet rods and the device 100 and the gauntlet itself, so that the system has sufficient degrees of freedom to allow displacement and rotation generated by the adaptation of the device to the sections to be inspected, of the components of the device 100. The lower springs 8*c* will work on compression while the upper springs 8*a* will work on traction and the central springs 8*b* will work on flexion.

The installation of each sensor 1 in the respective housings 2 can be threaded, which is not limited to this possibility.

The device 100 is then placed in a template, for example, a tubular-shaped template which diameter matches the diameter of a pipeline that will be inspected, thereby molding itself to the shape of the template so as to embrace it like a sleeve. Thus, the sensor matrix of the device 100 is capable of simultaneously measuring multiple points of the pipeline, providing an inspection of a much larger area than conventional inspections that use only a single sensor.

It is also necessary to consider the curves of the pipelines, which are points of particular interest where failures are most common. For these applications, the longitudinal rods 7 and the support rods 8 are resilient, for example, springs, to adapt more easily to the curvature of a curved tube template that matches the curve to be inspected. Optionally, curvatures can be machined in the rods of each trough 3 according to the template of a curved tube that matches the curve to be inspected. In general, the diameters of such bends are on the order of 3 to 5 times the straight outer diameter of the pipeline.

The housings 2 and the rods 6*a*, 6*b*, 6*c*, 7, 8*a*, 8*b* and 8*c* that comprise the troughs 3 are preferably made of stainless steel for greater resistance to the aggressive marine environment. The fixing elements thereof, such as screws and nuts, are also preferably made of stainless steel.

It is possible to vary the spacing between the housings in the X direction, which is the length or longitudinal direction of the pipelines that will be inspected. If this spacing is reduced, the longitudinal resolution of the inspection is improved. Reducing the spacing in the Y direction improves the circumferential resolution, but limits the minimum diameter which the pipeline to be inspected can have.

Figure 7:
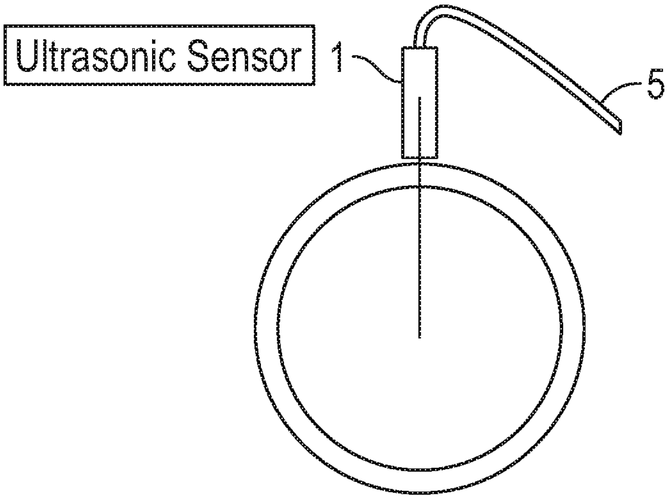
FIG. 7 is a representation of a sensor correctly positioned for measurement in a pipeline.

The molding of the device 100 around the template, and therefore the pipeline, is such that the sensors read in the direction of the pipeline diameter, as seen in FIG. 7. This is advantageous as the device 100 guarantees an adequate reading by avoiding misalignments that can occur in conventional inspection methods, as illustrated in FIG. 8.

Preferably, the fit of the device 100 around the template is fixed, so that transportation and handling do not alter the configuration and the fit around the pipeline to be inspected is preserved.

Figure 8:
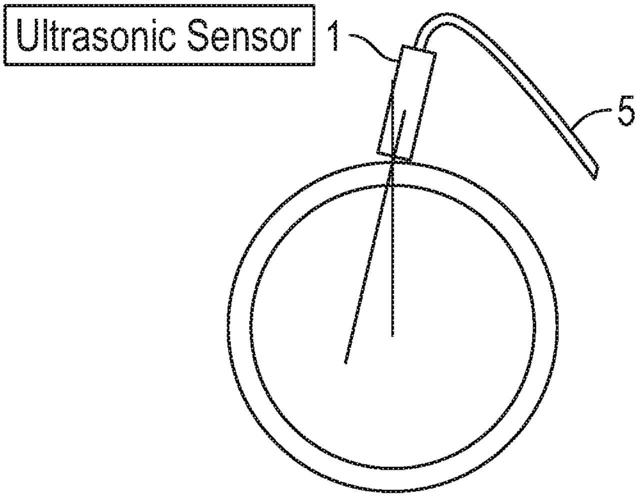
Figure 8 (Prior Art)
FIG. 8 is a prior art representation of a sensor incorrectly positioned for measurement in a pipeline.
Figure 13:
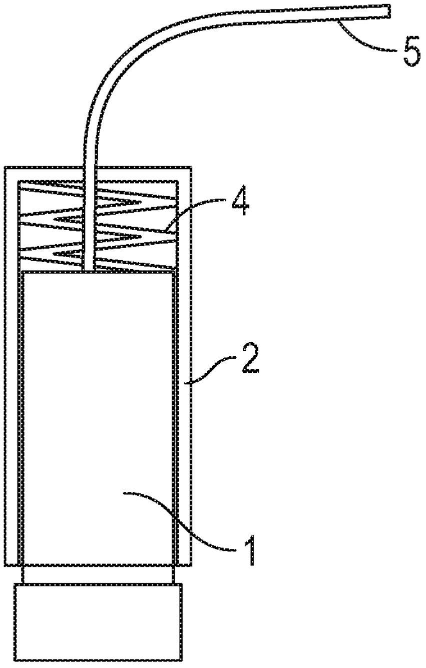
FIG. 13 is a representation of an alternative embodiment of the device housings according to the present invention.

In an exemplary embodiment, a data cable 5 is coupled to each sensor 1 for transmitting data from the sensor 1 to a vessel or surface platform, as can be seen in FIGS. 7, 8 and 13. The cable is typically driven along the ROV arm, fed from the surface, and descends in conjunction with the ROV umbilical. In this embodiment, each sensor 1 has its cable 5, which can be combined into a larger cable (not shown) or there can even be a local multiplexing system with simplified power supply from the surface. Of course, other data transmission techniques can be employed without departing from the scope of the present invention. For example, each sensor 1 could have an individual memory (not shown) or a single memory shared by all sensors 1 to store the data collected at each inspection, wherein the data would be downloaded from each individual memory or from the shared memory after the device of the present invention is brought back to the surface.

Figure 9:
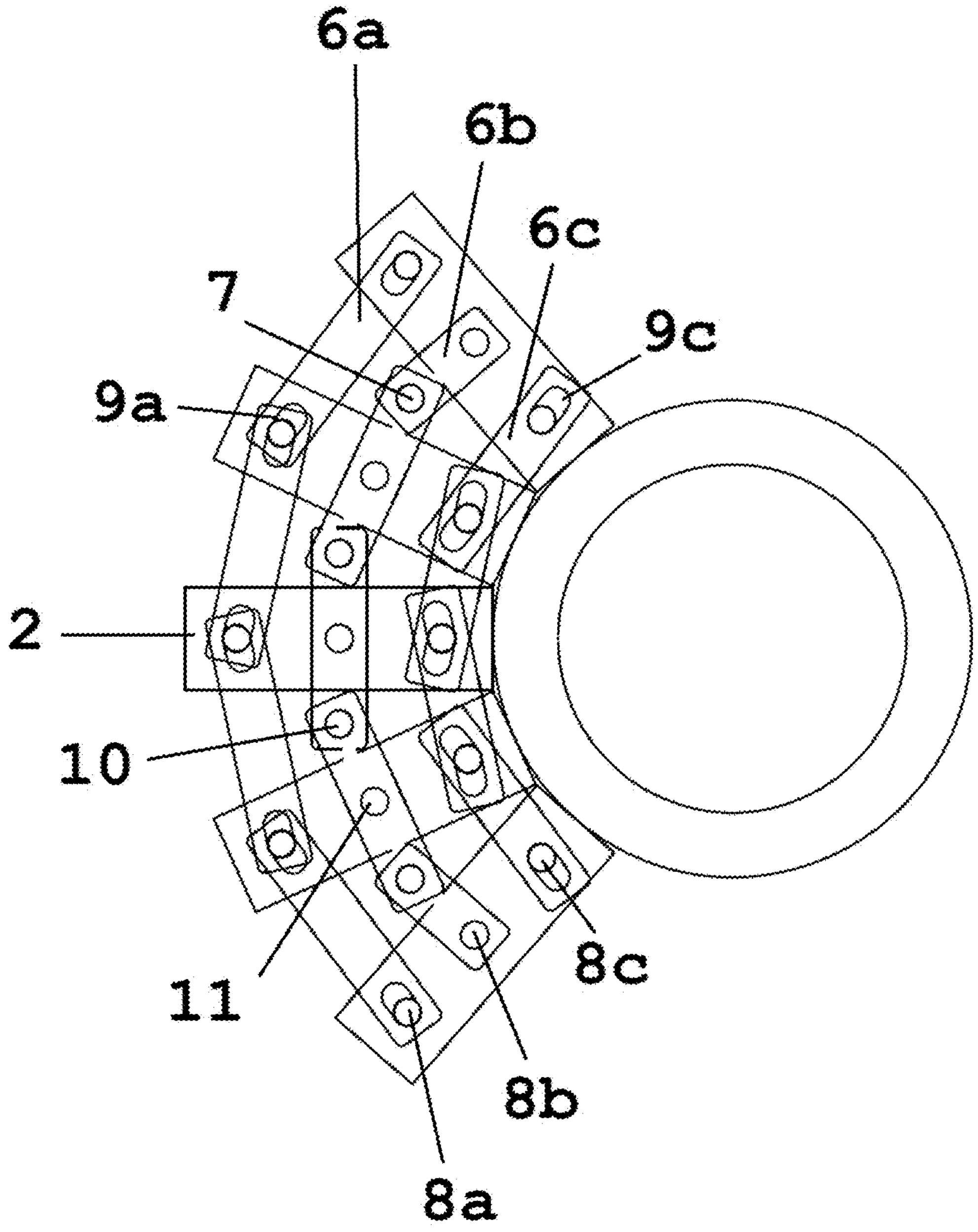
FIGS. 9 and 10 are representations of the present invention device according to the embodiment of FIG. 1 coupled to a pipeline that will be inspected, for two different diameters.
Figure 10:
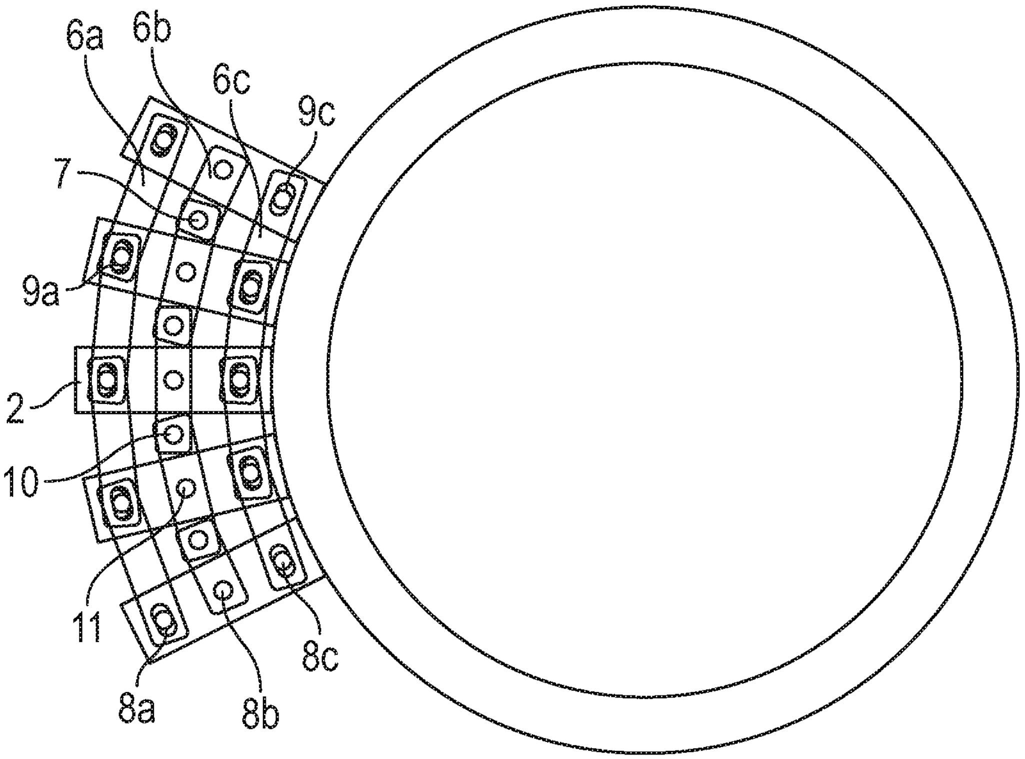

Referring now to FIGS. 9 and 10, the device 100 of the present invention is illustrated coupled to a pipeline that will be inspected. FIG. 9 illustrates a pipeline with a smaller diameter than the pipeline in FIG. 10. As can be seen, the constructive configuration of the device 100 allows the sensors 1, which are in the direction of the supports 10, to be positioned correctly in relation to the pipeline whatever is its diameter.

Figure 11:
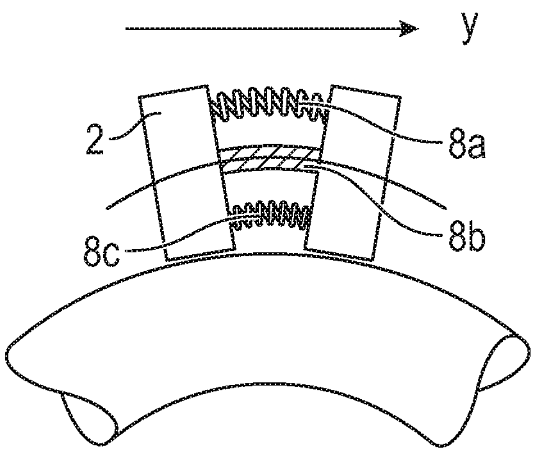
FIG. 11 is a representation of the present invention device according to the embodiment of FIG. 4 coupled to a pipeline that will be inspected.

With reference to FIG. 11, the device 100 of the present invention in the embodiment of FIG. 6 is illustrated coupled to a curved pipeline that will be inspected. Also, in this embodiment it can be seen that the resilient constructive configuration of the rods 8*a*, 8*b* and 8*c* allows the sensors 1, which are in the direction of the supports 10, to be correctly positioned in relation to the pipeline whatever is its diameter and curvature.

Typically, there are two distinct diameters in the tubular sections of subsea equipment, one for the production circuits and the other for the service circuits or gas lift. There may also be several curves in the pipelines. As mentioned previously, curves are points of particular interest as failures are more frequent therein. An example of this is seen in the FIG. 12, which illustrates a typical submarine equipment 300 known as manifold or Christmas tree, where you can see several pipelines of different diameters. Several of these pipelines are difficult to access, for example pipeline 301. With the device 100, the ROV 200 can easily position the sensors in difficult to access locations, such as the pipeline 301, having confidence that the sensors will be well-positioned for proper inspection.

Fixation occurs by pressing the device 100 against the pipeline to be inspected.

Preferably, the diver or ROV will descend with different units of the device 100 according to the present invention, in order to cover all diameters and/or curvatures of pipelines that are desired to inspect. Advantageously, this allows all necessary measurements to be made in just one descent and with a very high degree of reliability and precision.

Since there is spacing between the housings 2 and the sensors 1, it is possible to move the device 100 in the x or y direction to a distance such that the sensors 1 fall on points not covered in the previous measurement step. Advantageously, the constant spacing between the sensors 1 in the device 100 ensures that initially uncovered points are inspected after moving the device 100 an appropriate distance. Advantageously, this also allows the same points to be inspected again on future occasions, allowing to establish a timeline over a large area of the pipeline.

Figure 12:
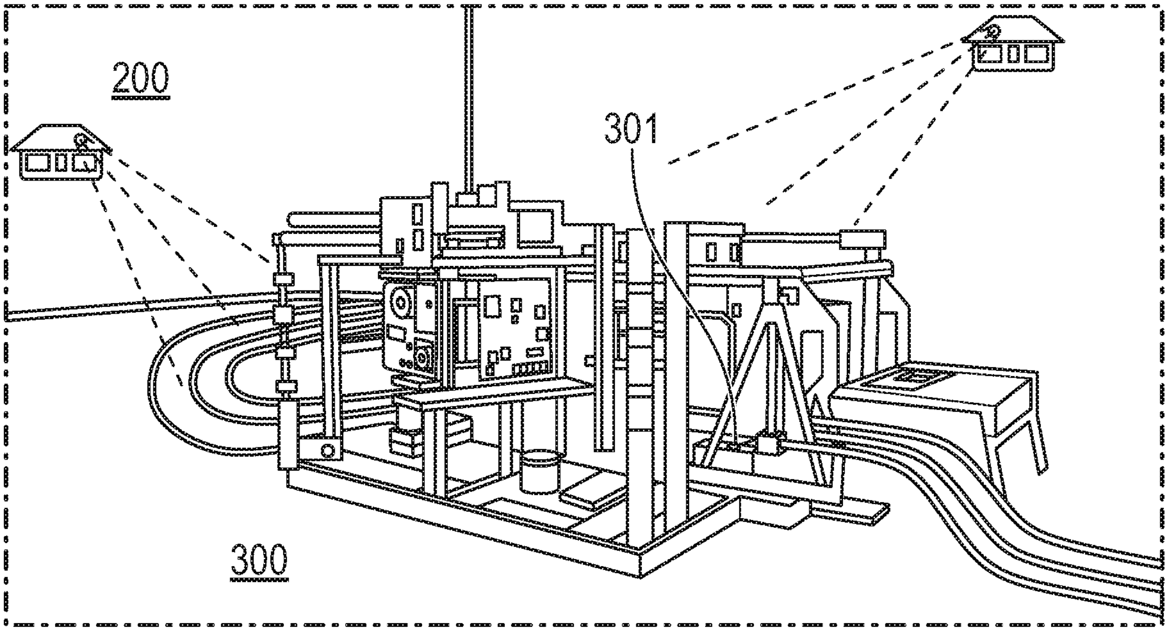
FIG. 12 is a representation of a Christmas tree, containing pipelines to be inspected.

These advantages are not possible in the prior art, as the use of just one sensor, which does not have the assistance of other points that increase the area of inspection promoted by a mesh or point matrix, provided by the housings 2 and the troughs 3 of the present invention, makes it very difficult to precisely position it in a difficult-to-access pipeline such as pipeline 301 in FIG. 12. The prior art also does not allow to establish a timeline for the same inspected point or area in the pipeline over the course of several inspection campaigns, as it is not possible to guarantee with a satisfactory degree of precision and reliability that the same point or area is being inspected every campaign.

Another advantage of the present invention is that a much larger area can be inspected in a very short time. It not only increases the accuracy of inspections, making the degree of reliability much greater, but also the time spent on this operation is much less, reducing operational costs.

Optionally, sensors 1 can be installed in housings 2 with the aid of a spring 4 as seen in FIG. 13. The force exerted by the pipeline surface on sensor 1 when the device 100 is positioned is supported by the spring 4, assisting in the correct positioning of each sensor 1.

Optionally, one of the troughs 3 may have a handle to be grasped by the diver or the mechanical arm of the ROV, to facilitate positioning of the device 100. Preferably, this maniple is located in the central region of the trough towards the center of the device. Preferably, the number of troughs would be odd so that there is a balance of efforts, which makes handling the device easier.

In an alternative embodiment, the troughs 3 and housings 2 are constructed to be adjustable rather than fixed, so as to be able to perform inspections at varying diameters with the same device unit 100. In this case, the adjustment can be made before transport and locking elements can be actuated to secure the adjustment.

In yet another alternative embodiment, adjustment of the device 100 is made at the time of positioning in the pipeline to be inspected. In this case, the fixing elements ensure that the adjustment is such that the sensors 1 are correctly aligned as seen in FIG. 7. In this embodiment, the fastening elements of the device 100 can be magnetic magnets or even remotely activated electromagnets. Optionally, the fastening elements may be installed in the housings 2 of each of the four vertices of the device 100.

The present invention allows the coupling of a large number of sensors and guarantees their precise positioning on the external surface of the pipeline to be inspected within a range of diameters/curvatures. The geometry itself allows the device to be more firmly positioned, generating more accurate readings and the matrix positioning of the sensors allows mapping to take place in a region and not at a single point.

Advantageously, the measurement operation is much faster and with automated processing and generation of a deformation field, with much higher resolution than currently practiced.

Advantageously, the present invention provides greater assertiveness in the search for the point with the smallest existing thickness, bringing greater security to the estimated remaining life of the evaluated pipeline, allowing the use of lower safety coefficients, which allows it to act for longer before condemning an equipment, with less probability of the equipment failing earlier than estimated.

Although the aspects of the present disclosure may be susceptible to various modifications and alternative forms, specific embodiments have been shown by way of example in the drawings and have been described in detail herein. But it should be understood that the invention is not intended to be limited to the particular forms disclosed. Instead, the invention must cover all modifications, equivalents and alternatives that fall within the scope of the invention as defined by the following appended claims.

The invention claimed is:

1. A thickness measuring device for measuring thickness of a pipeline or tubular body of submarine equipment simultaneously at multiple points on said pipeline or tubular body, characterized in that the thickness measuring device comprises:

a plurality of troughs, each trough comprising a plurality of latitudinal rods connected to each other and a plurality of support rods, each support rod passing through a port defined by each latitudinal rod, each trough of the plurality of troughs supporting a plurality of housings;

an ultrasonic sensor installed in each housing of the plurality of housings;

wherein the thickness measuring device is configured to embrace the pipeline or tubular body like a sleeve.

2. The thickness measuring device according to claim 1, wherein each housing of the plurality of housings further comprises spring.

3. The thickness measuring device according to claim 1, wherein the thickness measuring device is molded in a template before being positioned like the sleeve embracing the pipeline or tubular body.

4. The thickness measuring device according to claim 1, wherein each trough further comprises a plurality of longitudinal rods, each longitudinal rod being coupled to the plurality of latitudinal rods.

* * * * *